C. Neumann.
Hoop Skirt.
№ 1755
Reissued Aug. 30, 1864.
Fig. 1.
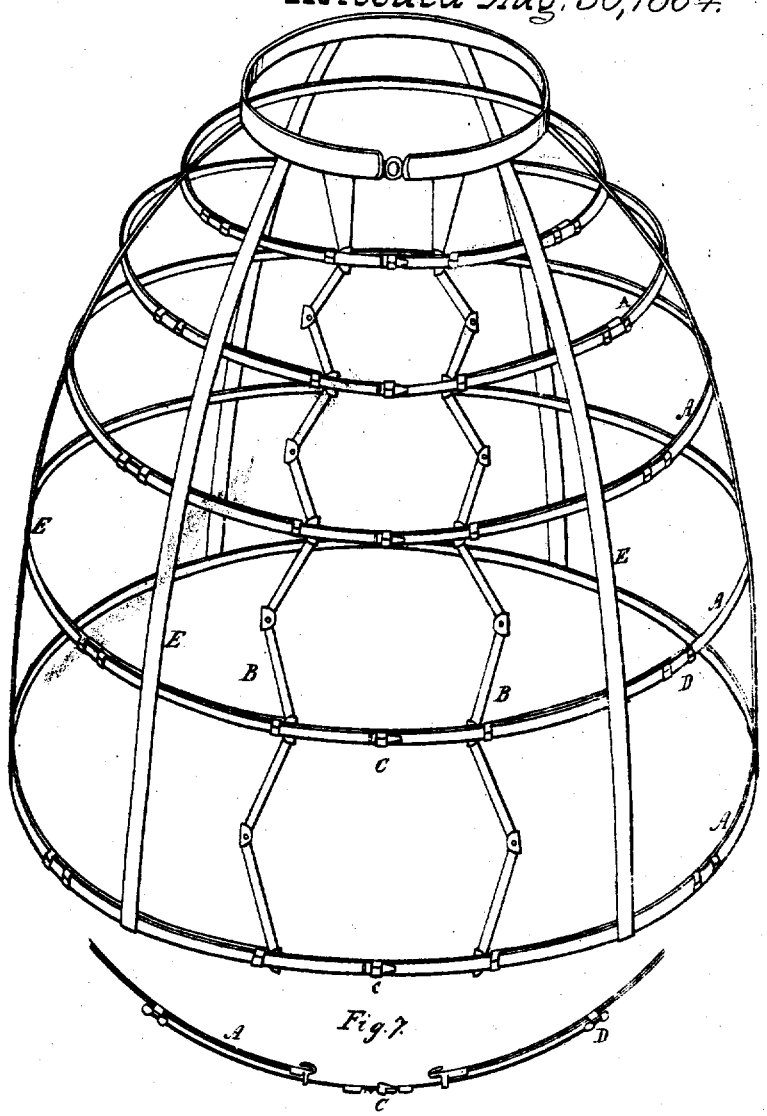
Fig. 7.
Fig. 2
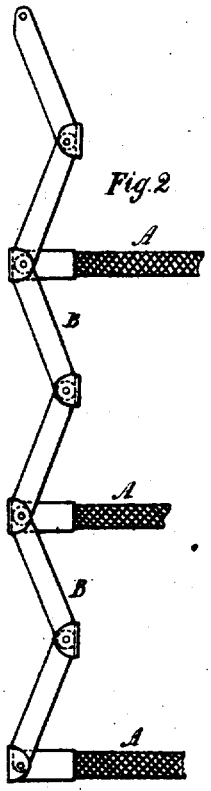
Fig. 3.
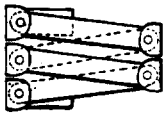
Fig. 4
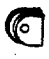
Fig. 5.
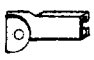
Fig. 6.
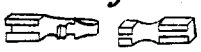
Witnesses.
Albert Wheeler
A. Pinney, Jr.
Inventor.
Caesar Neumann

UNITED STATES PATENT OFFICE.

CAESAR NEUMANN, OF NEW YORK, N. Y.

IMPROVEMENT IN SKELETON SKIRTS.

Specification forming part of Letters Patent No. 25,136, dated August 16, 1859; Reissue No. 1,755, dated August 30, 1864.

*To all whom it may concern:*

Be it known that I, CAESAR NEUMANN, of the city, county, and State of New York, have invented a new and Improved Skeleton Skirt; and I do hereby declare that the following is a full, clear, and exact description thereof, which will enable others skilled in the art to make and use the same, reference being had to the accompanying drawings, forming part of this specification, in which—

Figure 1 represents a perspective view of my invention. Fig. 2 is a detached elevation of the jointed supporter for the hoops or wires, whereby the skirt may be readily folded up. Fig. 3 is an elevation of the same when folded. Fig. 4 is a perspective view of the lugs forming a portion of the joints in the hinged supporters. Fig. 5 is a perspective view of the guide or clasp which unites the hoops with the supporters. Fig. 6 shows the clasp employed for fastening the hoops in front and holding them when fastened, and also for allowing the same to be unfastened, when the whole front of the skirt is to be made open. Fig. 7 is a top view of the front part of one of the hoops, with its connections.

Similar letters of reference indicate like parts.

This invention consists in a hoop-skirt which is open in front from top to bottom, so that in putting it on, the wearer is not obliged to throw the same over the head, and that the ends of the skirt can be folded one over the other when it is desired to reduce the size of the same, or drawn apart and connected by suitable connecting-pieces when the size of the skirt is to be increased. The open ends of the wires are to be fastened by strips of metal, bands, tapes, or cords, and the additional wires are fastened to each other and to the main wires by clasps, buttons, hooks, or other means, so that they can be easily fastened or unfastened when it is desired to open the skirt or to enlarge or diminish the size. A steel waistband is used to fasten the skirt to the body.

The hoops or main wires A A are supported in any convenient way that shall be most advisable, but instead of being endless or jointed together by any of the ordinary clasps or slides their ends are unconnected in front, except as hereinafter described.

The skirt is thus open in front from top to bottom, and the ends of each of the wires are connected to those next to it either above or below, or both, by means of tapes, cords, or strips of metal, as may be most convenient. Under all circumstances it is desirable that these hoop-supporters B should be made of some flexible material, and if made of metal they consist of short pieces so jointed to the wires that they can be folded, and at the ends of each wire there are two such pieces which are jointed together by a rivet running through both and through a small cap, B′, (see Fig. 4,) in such a manner that the joint formed can only be folded one way, like an elbow-joint. The joint at the wires is similar, and is effected by the clasp B*, that unites the parts, and is shown in Fig. 5. By the use of the metallic connections a certain firmness and stability may be given to the wires, which may be necessary or desirable in making them open in front, while they permit the skirt to be gathered up like the ordinary one.

If it is desirable to fasten some or all of the wires in front, a hook-clasp, $B^2$, such as shown in Fig. 6, or any other convenient fastening, may be used, which can be readily fastened and unfastened. Said hook-clasps, however, may be used in connection with extension, pieces or additional wires D, (see Figs. 1 and 7,) by connecting to the ends of each wire a piece of wire provided with the ordinary metallic slide and sliding on the main wire A, as clearly shown in Fig. 7. The ends of these extension-pieces are then jointed at will by the wearer, and an extension-skirt is thus formed, while they can be readily disunited, so as not to interfere with the skirt open in front.

The waistband E is made of a piece of steel wire similar to the main wires of the skirt, and its ends are jointed together by a hook-clasp, or in any convenient manner, so that they can be readily disunited.

Having thus described my invention, I claim as new and desire to secure by Letters Patent—

1. The divided hoops A A to adapt the skirt to be opened in front from top to bottom.

2. The combination of the jointed or hinged hoop-supporters B and a series of horizontal wires, A, when arranged and operated in the manner and for the purpose substantially as set forth.

3. The additional wires or extension-pieces D, connected to the main wires A of a hoop-skirt and to each other by clasps, buttons, hooks, or other equivalent means, so that they can be readily opened and closed, and at the same time the skirt can be enlarged or contracted.

4. The metallic waistband E, in combination with a hoop-skirt.

CAESAR NEUMANN.

Witnesses:
J. P. HALL,
M. M. LIVINGSTON.